Oct. 27, 1970   J. M. DESLIERRES   3,536,298
CABLE HANDLING WINCH

Filed May 9, 1968                           9 Sheets-Sheet 1

INVENTOR.
JOHN M. DESLIERRES
BY Edward Dugas
ATTORNEY

Oct. 27, 1970   J. M. DESLIERRES   3,536,298
CABLE HANDLING WINCH

Filed May 9, 1968   9 Sheets-Sheet 2

INVENTOR.
JOHN M. DESLIERRES
BY *Edward Dugas*
ATTORNEY

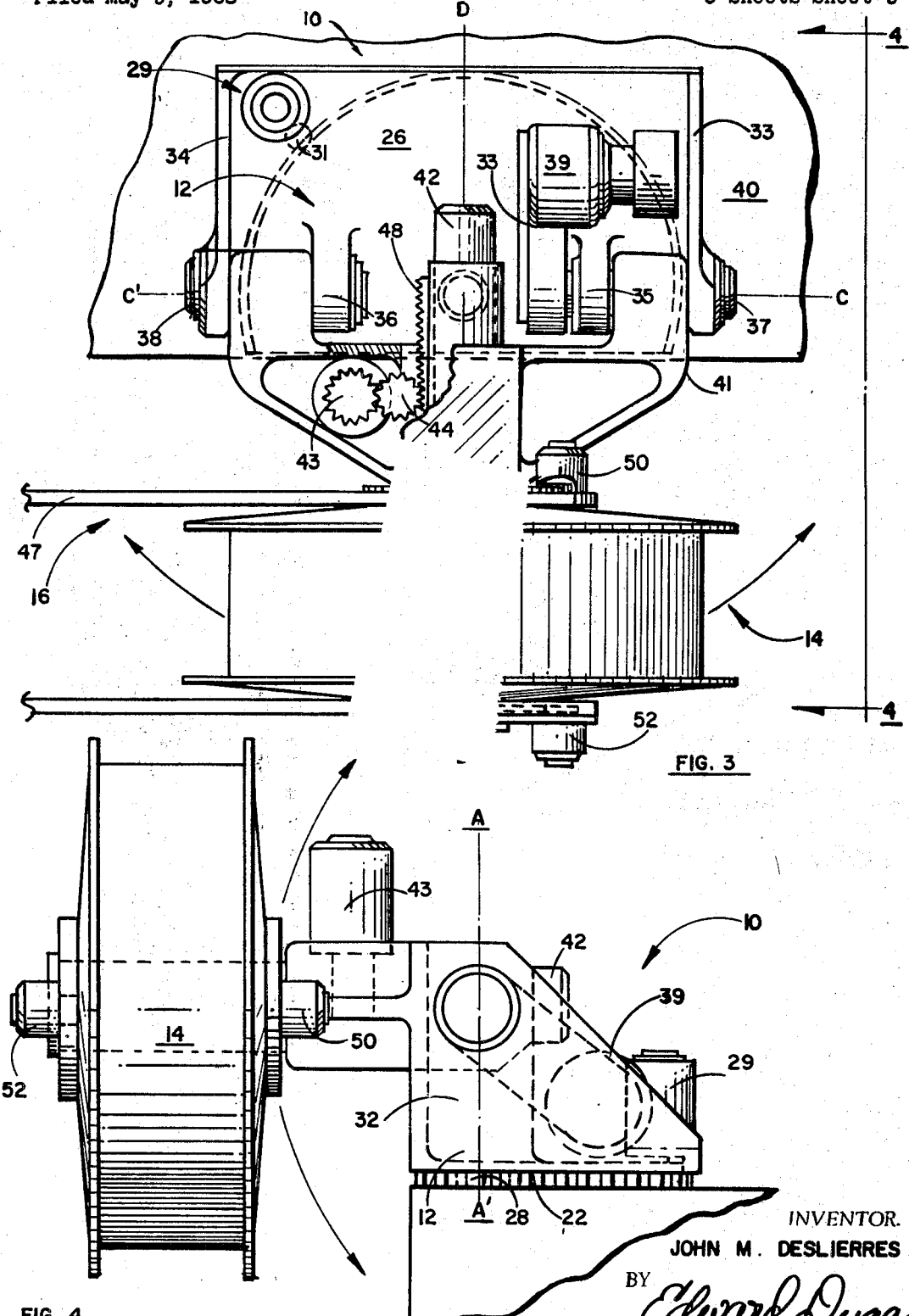

Oct. 27, 1970    J. M. DESLIERRES    3,536,298
CABLE HANDLING WINCH
Filed May 9, 1968    9 Sheets-Sheet 4

*INVENTOR.*
JOHN M. DESLIERRES
BY *Edward Dugas*
ATTORNEY

INVENTOR.
JOHN M. DESLIERRES
BY Edward Dugas
ATTORNEY

Oct. 27, 1970   J. M. DESLIERRES   3,536,298
CABLE HANDLING WINCH
Filed May 9, 1968   9 Sheets-Sheet 6

INVENTOR.
JOHN M. DESLIERRES
BY Edward Dugas
ATTORNEY

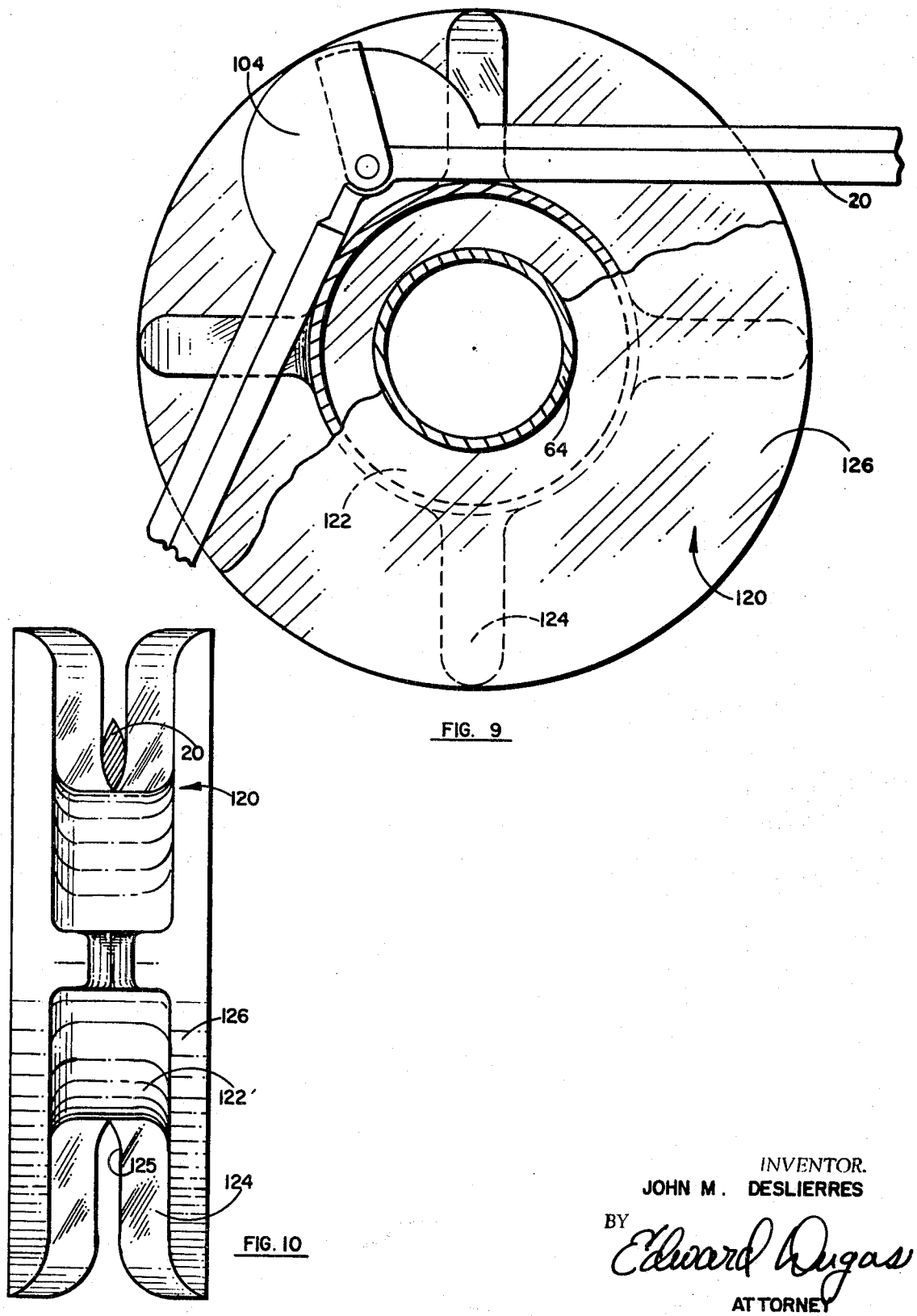

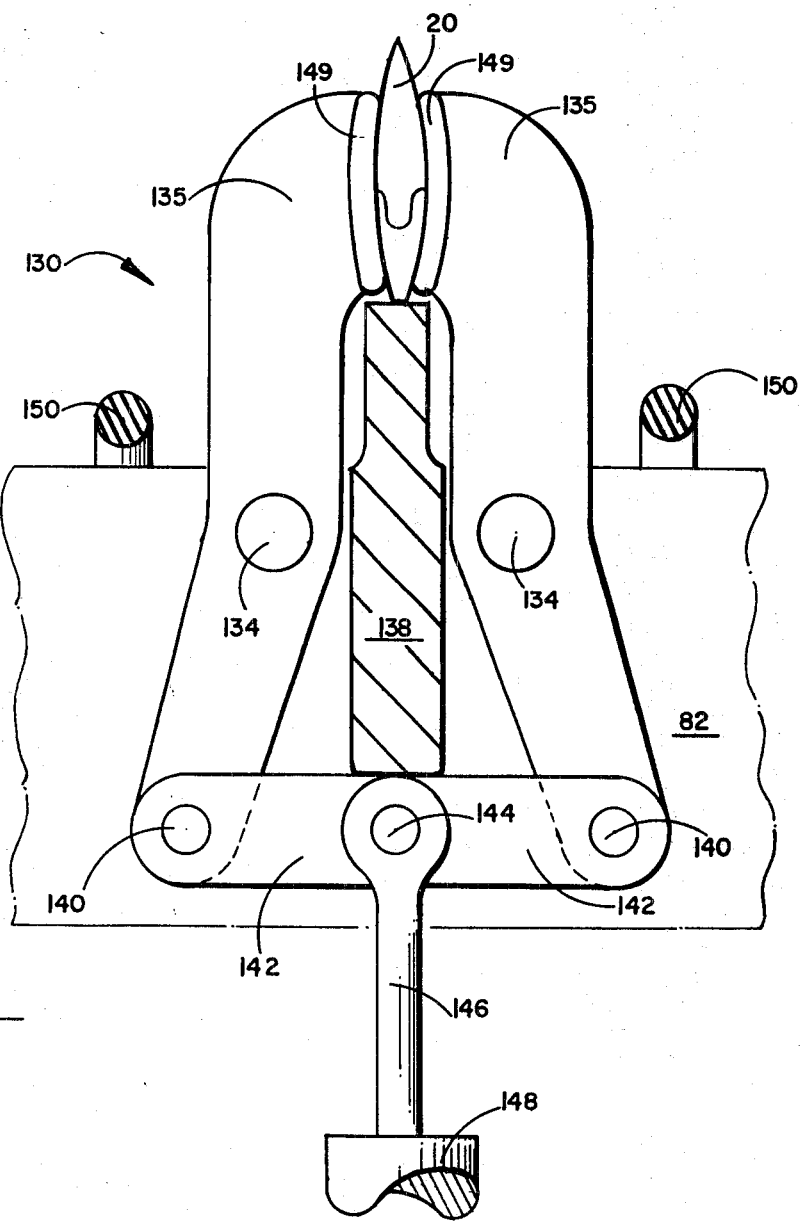
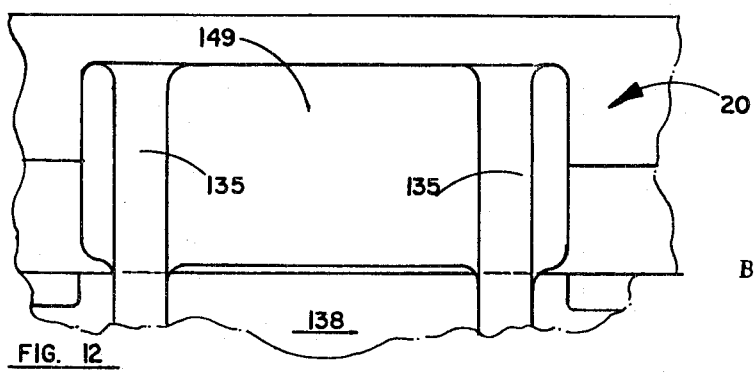

United States Patent Office 3,536,298
Patented Oct. 27, 1970

3,536,298
CABLE HANDLING WINCH
John M. Deslierres, Rolling Hills, Calif., assignor to North American Rockwell Corporation
Filed May 9, 1968, Ser. No. 727,831
Int. Cl. B66d 1/30
U.S. Cl. 254—150      16 Claims

ABSTRACT OF THE DISCLOSURE

A cable reel is mounted to a pedestal assembly by means of a spring rate universal type mount. The mount allows the cable reel to align within at least two degrees of angular freedom to prevent breakage of a high speed tow cable under sudden loads. A pickup arm is attached to the shaft of the cable reel and is designed to move in a pendulum fashion when tension on the cable increases above a safe preload. The pickup arm is also provided with a snubber assembly to minimize shock loads to the towed vehicle, to the tow cable, and to the winch. Affixed to the end of the pickup arm is a cable drive assembly for reeling the cable onto the reel. The drive assembly utilizes preloaded rollers that are designed to allow the cable to slip if the tension should exceed a fixed preload. The entire reel assembly including the pickup arm is designed to pivot on the pedestal assembly for storage.

BACKGROUND OF THE INVENTION

Due to developments in the sonar field, it is now possible to have sonar detectors which can be mounted into a relatively small streamlined body for towing below the surface of the water by either slow flying aircraft such as helicopters or fast-moving boats. Various problems have arisen pertaining to the hydrodynamic shape of the tow cable and the shape of the towed body. At high speeds, the towed sonar detector should, ideally, cut through the water with a minimum amount of turbulence and a maximum amount of stability. The tow cable has a major effect upon the stability of the towed body and various streamlining shapes have been used to minimize the drag and other undesirable effects. With all of these precautions, shock loads are still applied at random times to the cable and in turn to the winch assembly on which the cable is stored. If, for example, the towing vehicle maneuvers sharply to cover a likely search area, there will be an abnormal loading of the tow cable which may in turn cause the cable to snap, causing in turn a loss of the sonar detector and many feet of specially shaped and expensive cable, along with the abortion of the particular mission.

It is, therefore, desirable to have a cable winch which can take up shock loads applied along a plurality of planes such as would be encountered in high speed maneuvers and which also could conveniently receive the sonar detector and housing and position it for easy release and retrieval while affording it a degree of protection in a stored position.

Various devices exist in the prior art for towing cable and for absorbing changes in the cable tension. One such device is disclosed in U.S. Pat. No. 3,113,739 entitled, "Cable Winding Device," by B. B. Elder. In that device, a tension sensing pulley is positioned in contact with the towed cable and controls a friction braking element which is in constant contact with the cable reel to control the tension applied by the reel. The above method of cable tension control is fine as long as the tension is applied substantially perpendicular to the shaft of the reel; but when the vehicle doing the towing makes a sharp turn, the angle between the towed cable and the shaft of the reel is no longer perpendicular and any preset adjustment as to breaking friction on the reel no longer applies. In the device of this invention, the reel is mounted on a universal joint which allows the reel to align within at least two degrees of angular freedom to take up sudden changes in tension and misalignment.

Another tension device is disclosed in U.S. Pat. No. 2,845,235 entitled, "Electromagnetic Wire Tension Device," by A. F. Wilcox. In that patent, a tension sensing pulley controls a rheostat which in turn controls the strength of a magnetic field which operates as a variable brake upon the cable reel. By increasing or decreasing the magnetic field as a function of tension, it is possible to limit the tension in the cable. Again, this device operates essentially only in one plane; namely, the plane perpendicular to the axis of the reel and is not particularly adaptable to towing a cable behind a high-speed maneuverable vehicle.

Various other tension devices exist in the prior art such as the devices disclosed in the following patents: U.S. Pat. No. 2,992,792 entitled, "Wire-Unwinding Device Suited More Particularly for Use With Coil-Winding Machines," by W. Van Der Hoek; U.S. Pat. No. 1,873,-422 entitled, "Wire Unreeling and Tensioning Device," by C. J. Keller; U.S. Pat. No. 3,101,912 entitled, "Tensioner," by T. S. Bartlett; and U.S. Pat. No. 2,534,130 entitled, "Wire Tensioning Device," by W. R. Hunt.

Each of the above referenced patents are unsuited to high speed towing at different maneuvering angles because the shaft of the reel is always rigidly mounted with respect to the plane of the base (vehicle) and tension adjustments, and shock loadings in other planes are not compensated for.

SUMMARY OF THE INVENTION

In a preferred embodiment of this invention, the cable reel is mounted to a pedestal assembly by means of a spring rate universal type mount. The mount allows the cable reel to align within at least two degrees of angular freedom to prevent breakage of a high speed tow cable under sudden loads or misalignments. A pickup arm is attached to the shaft of the cable reel and is used as a compensating lever to inhibit the transfer into the tow cable of high dynamic loads caused by vehicle pitch in high seas. The pickup arm is designed to pivot about the reel center under a predetermined load to prevent the cable from breaking. A shock absorbing assembly (snubber) is mounted to the ends of the pickup arms, and affixed to the shock absorber assembly is a cable drive assembly for reeling the cable onto the reel. The cable drive assembly utilizes preloaded rollers that are designed to allow the cable to slip if the tension in the cable should reach above a predetermined critical value. Locking means are affixed to the pickup arm for locking the cable in position once it has been reeled out to the desired towing length. The entire reel assembly including the pickup arm is designed to pivot on the pedestal assembly for storage in a position which does not project from the hull or fuselage of the towing vehicle.

Accordingly, it is an object of the present invention to provide an improved cable handling.

It is another object of the present invention to provide a cable handling winch for use with a high speed tow cable.

It is an additional object of the present invention to provide a winch which is compliant in more than one plane.

It is another object of the present invention to provide a winch for high speed tow cables capable of limited restrained movement to compensate for dynamic loads in the towed cable.

BRIEF DESCRIPTION OF THESE DRAWINGS

The aforementioned and other objects of the present invention will become more apparent and better understood when taken in conjunction with the following description and drawings, throughout which like characters indicate like parts, and which drawings form a part of this application.

FIG. 3 is a top view of the embodiment illustrated in FIG. 2;

FIG. 4 is a front view in elevation of the embodiment illustrated in FIG. 2;

FIG. 9 is a sectioned view taken along the sectioning line 9—9 of FIG. 6;

FIG. 10 is a front elevation view of the apparatus of FIG. 9;

FIG. 11 is a sectioned view taken along the section lines 11—11 of FIG. 6;

FIG. 12 is a side view of the apparatus illustrated in FIG. 11;

DESCRIPTION OF THE PREFERRED EMBODIMENTS

Figure 1:
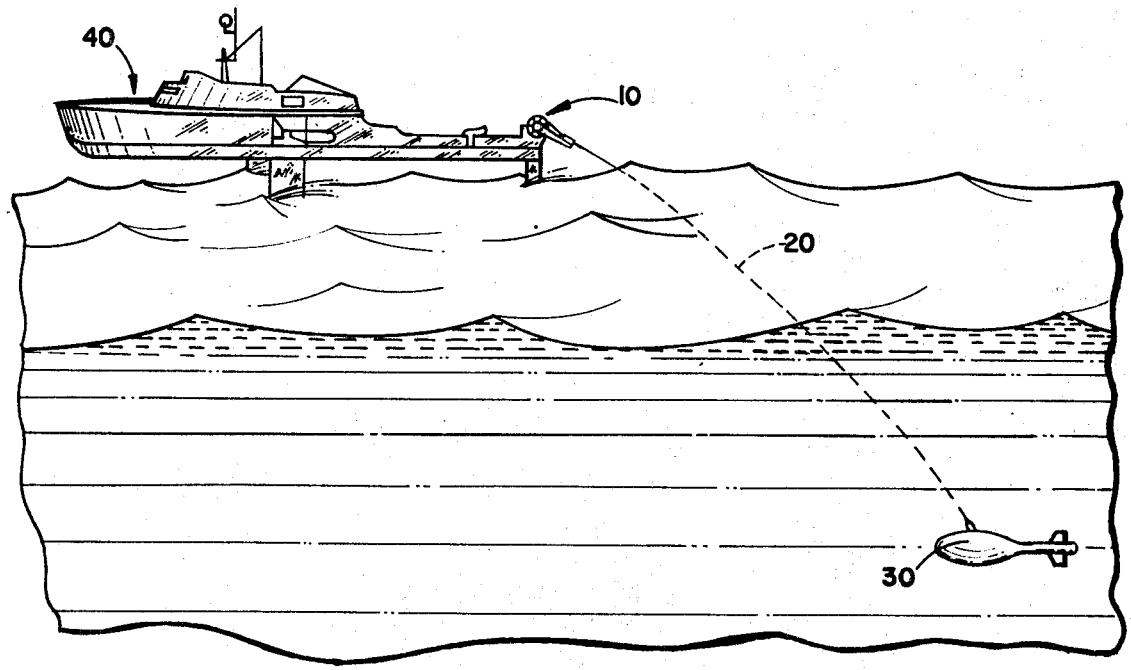
FIG. 1 illustrates the cable handling winch of this invention mounted to the after deck of a hydrofoil or other suitable tow vehicle.

Referring to FIG. 1, the cable handling winch 10 is adapted to be mounted upon a high speed vehicle such as a hydrofoil boat 40 for towing a submersed body 30 such as a sonar transponder by means of a streamlined tow cable 20.

Figure 2:
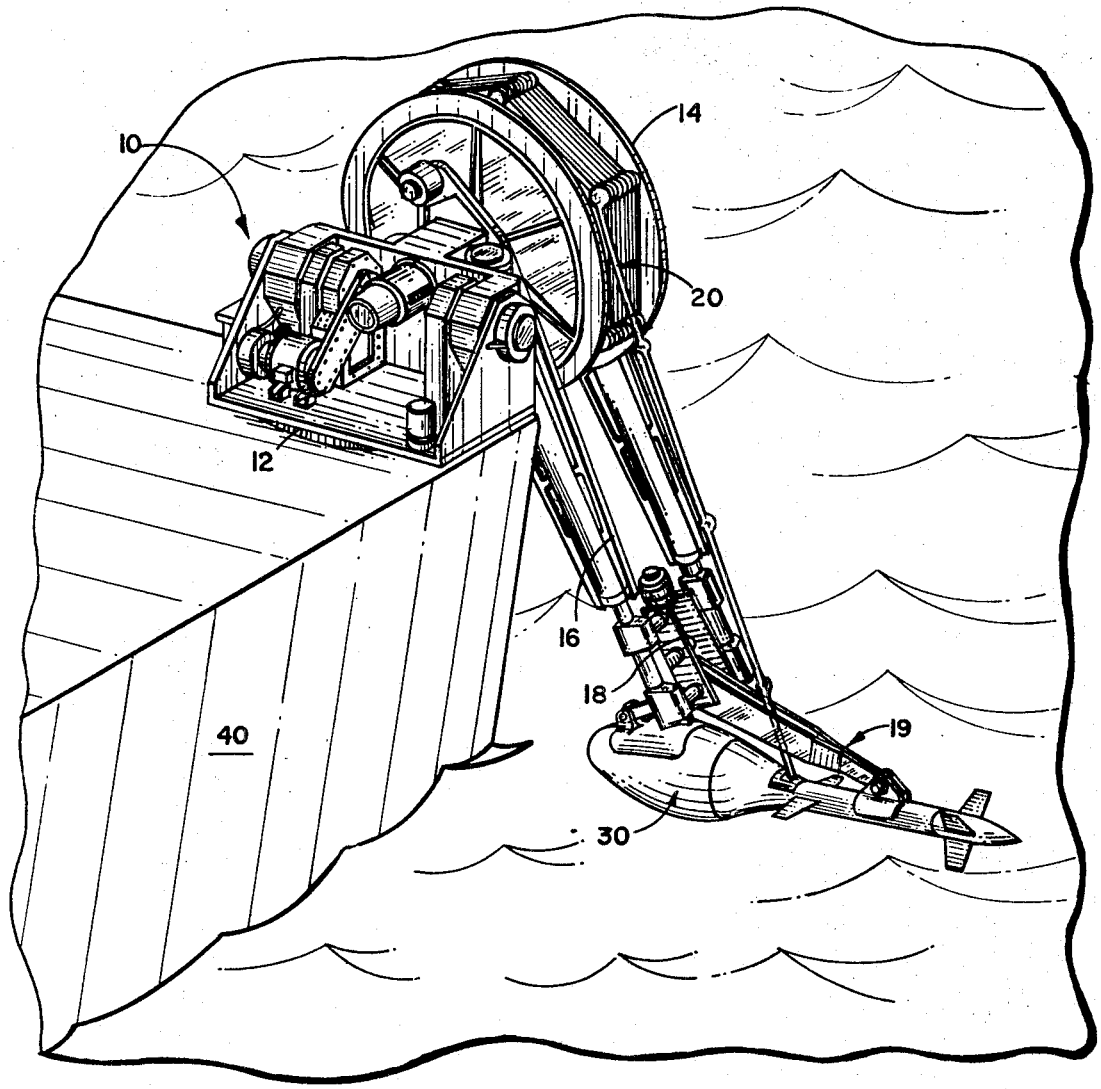
FIG. 2 is an enlarged projection view of the invention mounted to the after deck of the tow vehicle of FIG. 1.

Referring to FIG. 2, which is an enlarged view of the cable handling winch shown in FIG. 1, the winch 10 is shown comprised of a pedestal assembly 12 which mounts to the towing vehicle 40 and which supports a reel assembly 14 onto which is stored the high speed towing cable 20 for alignment within at least two degrees of angular freedom. A retrieval arm assembly 16 is mounted to the central axis of the reel assembly 14 (more clearly shown in the following figures) with a carriage assembly 18 attached to the ends of the retrieval arm assembly and which aligns the cable for sequential winding on the reel assembly 14, and which also provides a partial driving force for the rewinding of the cable 20. A cradle assembly 19 which receives and partially houses the towed body 30 in a stored position when it is not being towed is attached to the carriage assembly 18.

Figure 5:
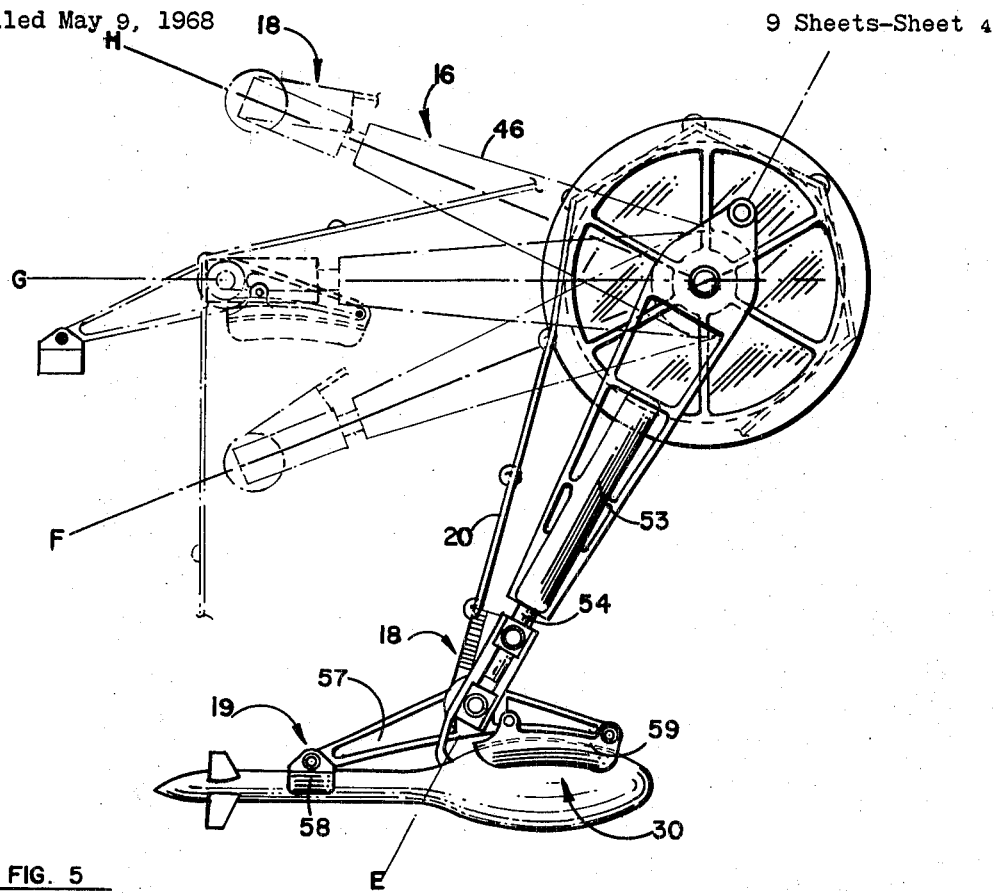
FIG. 5 is a side view in elevation of the embodiment illustrated in FIG. 2.

Referring now to FIGS. 3, 4, and 5, the pedestal assembly 12 is comprised of a base plate 22 which is shaped as a segment of a circular thin plate with gear teeth 24 positioned around the periphery thereof. The plate 22 is affixed to the vehicle 40 by bolts or other well-known means. A rotatable reel base 26 is rotatably mounted to the base plate 22 by means of a shaft and bearing arrangement 28. An electrical motor 29 affixed to the base 26 has its shaft connected via a gear assembly 31 to the gear teeth 24 in the base so as to rotate the reel base 26 about the axis A–A′. A pair of vertical flange members 32 and 34, respectively, extend upward from the base 26 to provide support for shafts 37 and 38 along an axis C–C′. A second pair of flanges 36 and 35 provide additional support for shafts 37 and 38. Mounted to shafts 37 and 38 is a yoke assembly 41 which supports a cylindrical shaft 42 onto which is mounted the reel assembly 14. The longitudinal axis of shaft 42 is perpendicular to the axis C–C′ and is designated D–D′. A motor 39 which is affixed to base 26 operates through a gear box 33 to rotate yoke 41 about the C–C′ axis. The yoke 41 is affixed to shaft 37 which in turn is coupled to gear box 33. An electrical motor 43 is affixed to the yoke assembly 41 with its output shaft coupled through a gear assembly 44 to gear teeth 48 extending along the shaft 42. By energizing 43, the reel assembly 14 may be extended or retracted along the axis D–D′. The reel shaft 42 can thus be extended along the axis D–D′, rotated about the axis C–C′, and also rotated about the axis A–A′. The reel 14 is rotatably mounted about the shaft 42. The retrieval arm assembly 16 is comprised of two arm portions 46 and 47 which are positioned on opposite sides of the reel assembly 14 and which are adapted to rotate as a pair about the shaft 42 independently of the reel assembly 14. An electrical motor 50 is affixed to the yoke assembly 40 and is connected through its drive to the arm 47 to rotate the arm 47 and position it about the axis D–D′. Affixed to arm 46 is an electrical motor 52 which provides the moving power for the reel assembly 14. Integral with arms 46 and 47 is a pair of snubber assemblies 53 which are shock absorbers of the piston type wherein the pistons 54 are adapted to move in and out in a restrained manner within the snubbers 53. Attached to the ends of pistons 54 is the carriage assembly 18 shown more clearly in FIG. 6. A self-centering body cradle 19 is rotatably attached to the end of the cradle assembly 18 by means of support assembly 57 which has mounted at its ends body-shaped receiver means 58 and 59, the contours of which conform to the outer shape of the towed body 30. The pickup arm 16 will rotate to various positions, dependent on cable tow load, four of which are shown as positions E, F, G, and H. Position E is the position used to launch and to retrieve the towed body 30. Position H provides the maximum resiliency for slow-speed towing or where the cable 20 is hanging down substantially perpendicular to the surface of the water. Relative position G is for medium high speed towing, and relative position F is for high speed towing.

The cable is most susceptible to breakage when the cable is hanging straight down or being towed slowly. The towed body is less able to move vertically and respond to any upward forces such as pitch, heave or roll of the tow vehicle. Therefore, any tendency of the tow vehicle to move in these directions is accepted as a rotational motion of arm 16 which is permitted to rotate from position H through positions G, F, and if required, to position E to minimize snap loads on cable 20. Under high speed towing conditions as might be assumed in positions G and F, the tow cable 20 is strung out in a more horizontal position and contains a relatively larger catenary due to increased drag. In these positions, the tow vehicle is less responsive to sea conditions due to its forward motion and the cable 20 is less susceptible to snap load breakage due to the high speed catenary in the cable. At all times, arm 16 is compliant and able to accept induced overloads in cable 20 by swinging pendulum fashion downward as conditions demand.

Figure 6:
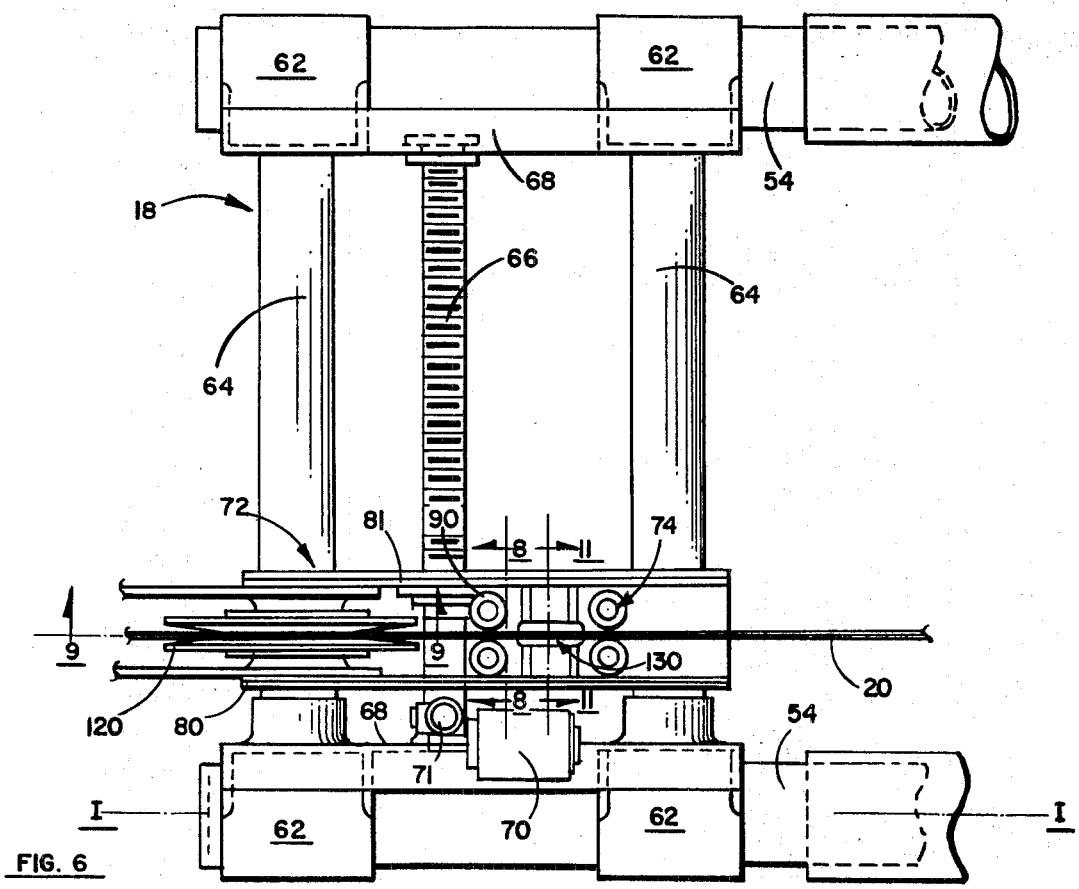
FIG. 6 is an enlarged elevation view of a portion of the embodiment illustrated in FIGS. 1 through 5.

Referring now to FIG. 6, the pair of pistons 54 extend into the snubber assembly 53 and are restrained therein in a standard shock absorbing manner, but are adapted to extend outwards along the axis I–I′ in the event an abnormal torque should be applied to the cable 20 substantially along the axis I–I′. A pair of tubular support structures 64 extend between the ends of pistons 54 and are fixably attached thereto by means of T-assemblies 62. A drive screw 66 is rotatably mounted to the tubular support structure 64 by means of a set of brackets 68. An electrical motor 70, the body of which is affixed to one of the brackets 68, has its output coupled by means of a gear drive 71 to the drive screw 66 for rotating the drive screw about its longitudinal axis. The drive screw 66 is coupled to a dual cable drive roller system 72 to move the drive system from one side of the carriage assembly to the other side as a function of the speed of the reel such that the cable is sequentially placed on the reel without fouling.

Figure 8:
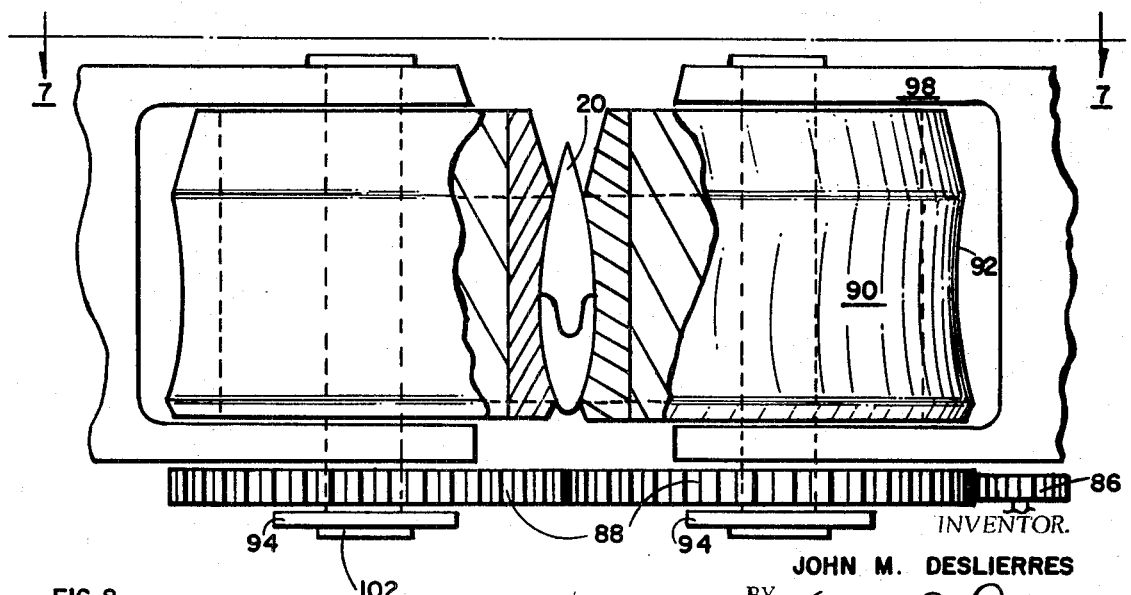
FIG. 8 is a sectioned view taken along the sectioning line 8—8 in FIG. 6.
Figure 7:
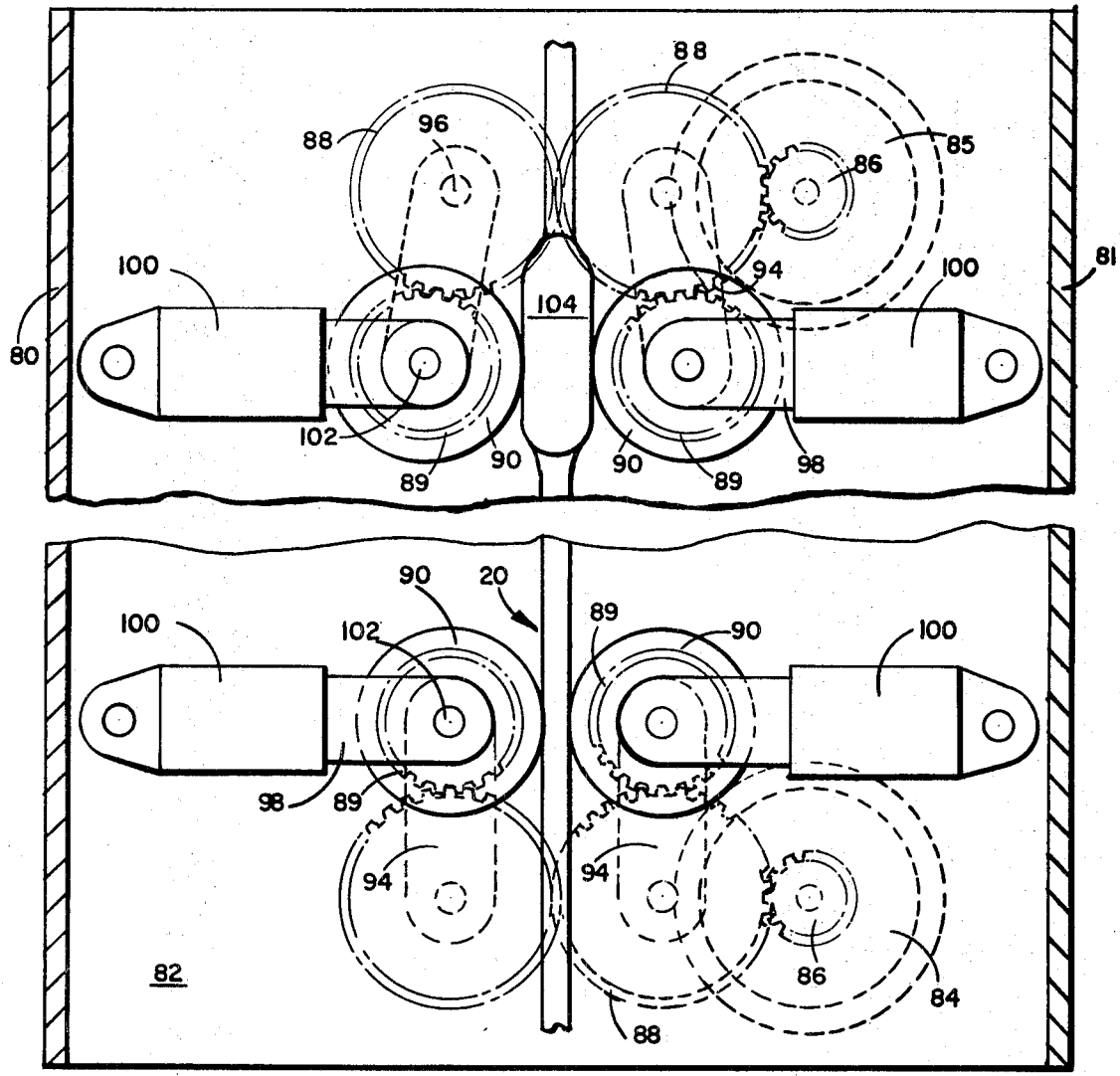
FIG. 7 is an enlarged, partially sectioned, view of a portion of the embodiment illustrated in FIG. 6.

Referring to FIGS. 7 and 8, the dual cable drive roller system 72 is mounted between carriage assembly members 80 and 81 by means of a base plate 82. Electrical motors 84 and 85 are affixed to the base plate 82, and through the gears 86 drive gears 88 and gears 89. Affixed to gears 89 are rollers 90, the rolling surface of which 92 is shaped to the contour of the towed cable 20. The rollers 90 are attached by links 94 to the shaft 96 about which gears 88 rotate with shaft 96 attached to the base plate 82. A clevis type bracket 98 attaches to the roller 90, through its shaft 102 at one end, and at its other end to a spring 100 which preloads the rollers against the outer surface of the towed cable 20. The rollers are shaped to apply the greatest pressure against the strongest part of the cable assembly. The cable is rolled through the roller assemblies in either direction. Inasmuch as the cable assembly is not of a constant section thickness, each roller has the ability to back off under load when the cable coupling joints pass through the assembly. The cable is always retained and driven by the other group of rollers when this occurs. Should extreme tension loads be induced in the cable during the in-haul operation, slippage through the rollers will occur and is permitted. The amount of slippage permitted would be controlled by the pre-load of the roller assemblies. As soon as the overload condition subsided, windup would continue. To prevent the possibility of tension breakage, the entire carriage assembly, on the end of the arm, is mounted to dual snubbers 53. These preloaded snubbers are also used to prevent damage to the towed body as it makes contact with the cradle in the in-haul function. The snubbers are designed to operate at a lower preload level than the slippage point of the roller assemblies. Both systems will prevent the cable from being subjected to intense peak loads.

Referring to FIGS. 9 and 10, the idler spool 120 has a central hub assembly 122, the innersurface of which rotates about the tubular support structure 64 on a bearing surface not shown for purposes of clarity. Projecting radially from the hub section 122 are four arms 124 positioned orthogonally with respect to each other and which have slots 125 therein corresponding to the width of the tow cable 20. Two outer disks 126 are positioned at the outer surfaces of radial arm members 124 to provide structural support; therefore, when an articulated cable having joints 104 is used with the winch assembly of this invention, the articulated joints fit in the space between the radial arm members 124, thereby eliminating the need for a gap 125 which would be greater than the width of the cable 20, except at the joint positions, and which would allow the cable to have a sloppy fit on the idler spool.

Referring to FIGS. 11 and 12, the cable clamp-up toggle lock assembly 130 consists of a left and right clamping member 135, which are pivoted on shafts 134 that are attached to the base plate 82. Attached to one end of members 135 are links 142 which are attached by means of a pivot joint 140 and which in turn are attached to an actuator shaft 146 by means of another pivot joint 144. An actuator 148 is attached to the actuator shaft 146 to provide the shaft with a longitudinal motion through the long axis of the shaft. Affixed to the pair of left and right clamping members is a curved friction plate 149, the curvature of which corresponds to the outer curvature of the high speed tow cable 20. A pair of stops 150 are positioned on each side of the clamping arms 135 to limit their open travel. The rest 138 positions the cable in alignment with the friction plates 149. The clamp in the closed position will hold the cable firmly in place.

Figure 13:
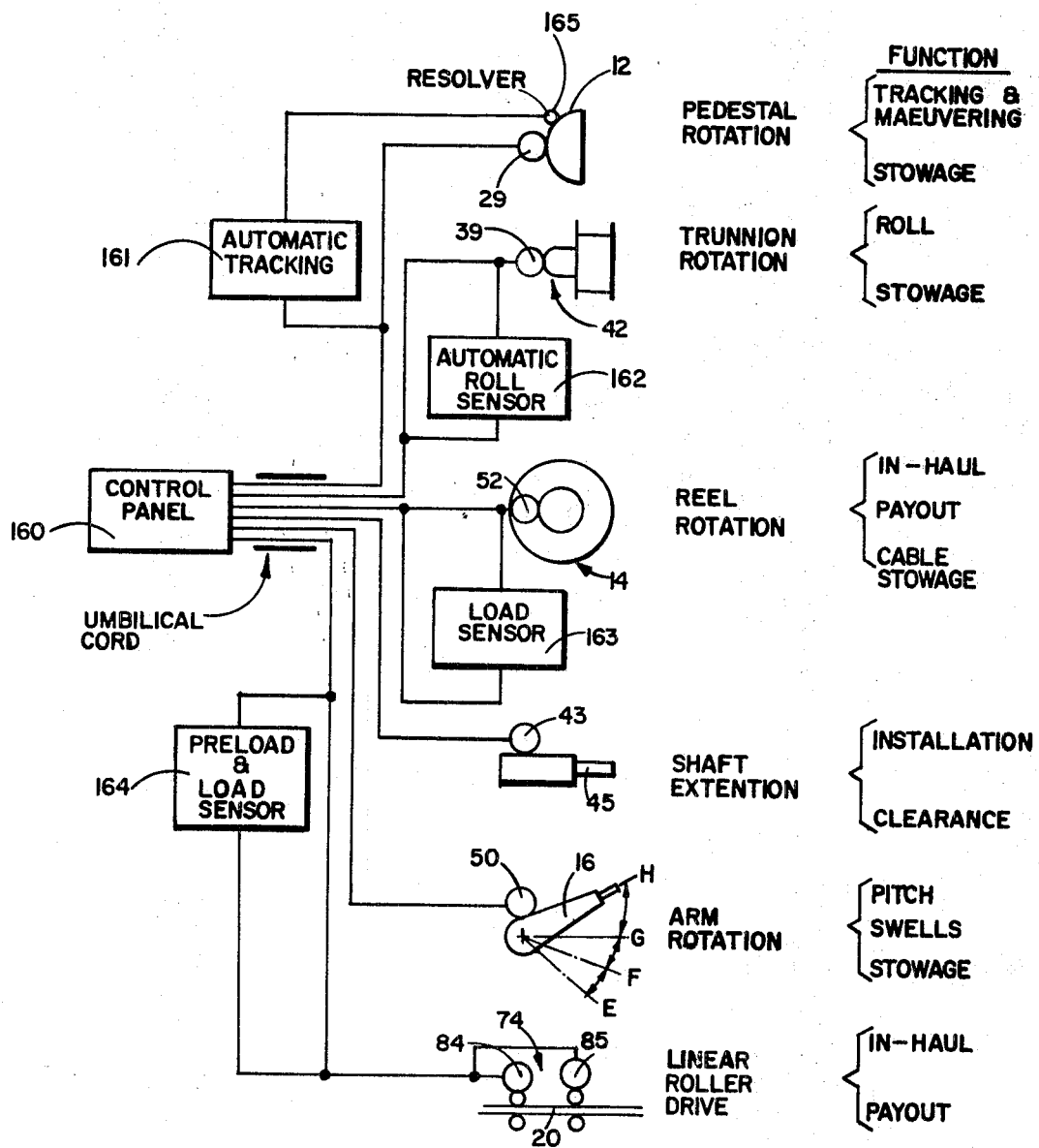
FIG. 13 is a block schematic diagram of a control system which may be utilized with the invention.

Referring to FIG. 13 wherein a control system which may be used with the invention is disclosed. The function of tracking and maneuvering the reel into various angular positions and for the stowage of the reel is accomplished by pedestal rotation. The amount of pedestal rotation is controlled by motor 29 which is driven from the control panel 160 with the angular position being determined by resolver 165 which feeds back an error signal to an automatic tracking servo 161 to drive the motor 29 to a null position. The function of roll and storage of the reel is accomplished through the rotation of the trunnion 41 by motor 39 under the control of an automatic roll sensor 162 which provides a roll signal to the trunnion motor to maintain the trunnion, and in turn the reel 14, in a substantially horizontal position even though the vehicle is rolling. For the storage position, it is necessary to override the roll sensor signal to reposition the reel about the trunnion axis for storage. The function of maintaining load tension through reel rotation for the in-haul, pay-out and cable storage is accomplished through the reel driver motor 52, the torque of which is controlled by a load sensor 163, which sensors the load on the reel and which adjusts the power input to the motor 52 to maintain the load below a predetermined value. The function of shaft extension is accomplished through motor 43, driven from the control panel 160, which in turn drives the shaft 42 in and out to the desired position. The arm rotation function which operates for pitch, swells, and storage, is controlled by an arm rotation motor 50, through the control panel 160. The linear roller drive function for in-haul and out of the cable is controlled through the dual cable drive roller system 74 which is activated by drive motor 84 under the control of the control panel 160 and a preload and load sensor 164 which sensors the load tension on the cable 20 and which maintains as a memory a safe preload level to allow the drive rollers to slip if the load should increase to a point beyond the memorized preload.

Figure 14:
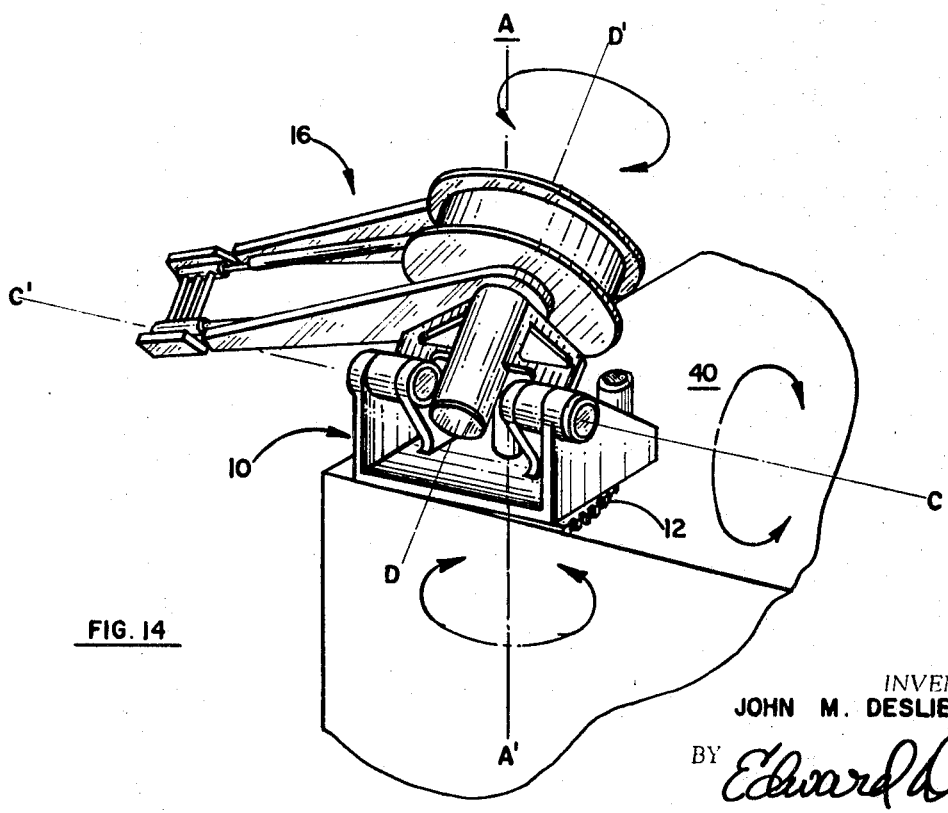
FIG. 14 is a projection view useful in understanding part of the operation of the invention.
Figure 15A:
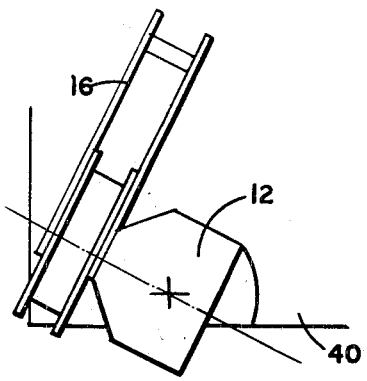
FIGS. 15A and 15B further explain the operation of the apparatus as shown in FIG. 14.
Figure 15B:
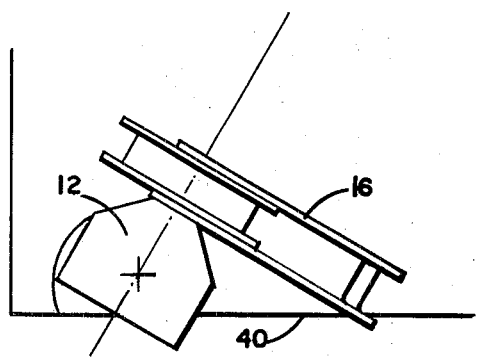

Referring to FIG. 14, wherein is shown the various stored positions for the cable winch assembly 10. For storage, the reel assembly is rotated about the axis C such that arm 16 clears the deck surface of vehicle 40. The entire pedestal assembly is then rotated about axis A-A' to place the arm 16 in-board on the vehicle. FIG. 15A illustrates one position of the arm 16 which may be used when it is not desirable to rotate the entire assembly about the C-C' axis. FIG. 15B illustrates a second storage position which may be used when it is again not desirable to rotate the reel assembly about the axis C-C'.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as may fall within the true scope of the invention.

What is claimed is:

1. A cable handling winch comprising in combination:
  a reel for storing a cable;
  means for mounting said reel to a reference frame, said means providing said reel with alignment within at least two degrees of angular freedom with respect to said reference frame;
  an arm assembly extending from the central portion of said reel;
  said assembly adapted for rotation about said reel center;
  means for controlling the movement of said arm assembly about said reel center; and
  snubber means affixed to said arm assembly to provide a shock absorbing action along the longitudinal axis of said arm assembly.

2. The invention according to claim 1 and further comprising:
(a) a carriage assembly mounted to the end of said arm assembly; and
(b) said carriage assembly adapted to move back and forth parallel to said reel center for guiding said cable onto and off of said reel.

3. The invention according to claim 2 and further comprising: cable drive means affixed to said carriage assembly for gripping and driving said cable onto said reel, with said cable drive means providing the primary pulling force on said cable and with said reel rotating under the control of said drive means.

4. The invention according to claim 3 wherein said cable drive means is provided with means for allowing said cable to slip when the tension in said cable reaches a predetermined value.

5. The invention according to claim 1 wherein said means for controlling the movement of said arm assembly allows movement of said arm assembly about said reel center when the load on said arm reaches a predetermined level.

6. The invention according to claim 3 wherein said cable drive means is comprised of at least one pair of preloaded drive surfaces which are adapted to accept varying thicknesses and shapes of tow cable while providing a drive force sufficient to reel said cable on said reel.

7. The invention according to claim 3 and further comprising: locking means affixed to said arm assembly for locking said cable to said arm assembly.

8. Comprising in combination:
a reel;
a cable adapted to be stored on said reel;
a pedestal assembly;
means mounting said reel to said pedestal assembly with alignment within at least two degees of angular freedom;
an arm assembly pivotly mounted with respect to said reel and providing a guide for said cable; and
means coupled to said arm assembly for variably resisting rotation of said arm about said pivot mount as a function of the tension in said cable.

9. The invention according to claim 8 and further comprising: servo means connected between said pedestal assembly and said mounting means for maintaining said reel in a predetermined position regardless of the motion of said pedestal assembly.

10. The invention according to claim 8 and further comprising: means for controllably extending and retracting the shaft on which said reel is rotated, and wherein said arm assembly is pivoted about the shaft of said reel and extends and retracts with said reel.

11. The invention according to claim 8 and further comprising: a carriage assembly mounted to the end of said arm assembly and adapted to move back and forth parallel to said reel center for guiding said cable onto and off of said reel.

12. The invention according to claim 11 and further comprising:
(a) cable drive means affixed to said carriage assembly for gripping and driving said cable onto said reel; and
(b) means for driving said reel to take up slack in said cable.

13. The invention according to claim 12 wherein said cable drive means is comprised of at least one pair of preloaded friction surfaces, said surfaces separating when a thicker section of cable is to pass between said surfaces.

14. The invention according to claim 15 and further comprising: servomechanism means connected to said yoke means for maintaining said reel shaft substantially in a fixed reference position regardless of the motion of said towed vehicle.

15. A cable handling winch for use on a high speed tow vehicle comprising in combination:
a pedestal assembly affixed to said tow vehicle;
a reel;
a tow cable adapted to be stored on said reel;
mounting means connecting said reel to said pedestal assembly, said means comprised of a base member mounted to said pedestal assembly for rotation about a first axis;
a yoke means supported from said base member for rotation about an axis substantially perpendicular to said first axis;
a shaft onto which said reel is mounted for rotation affixed to said yoke member with the axis of said shaft substantially perpendicular to the axis of said yoke means and said first axis;
an arm assembly pivotly mounted on said shaft and extending perpendicular to the axis of said shaft for supporting said cable as it is rolled onto and off of said reel;
means for rotating said reel;
cable drive means affixed to said arm assembly for driving said cable onto said reel;
means for sensing the tension of said cable and for adjusting the driving force of said cable drive means to prevent damage to said cable.

16. The invention according to claim 15 and further comprising: cable clamping means affixed to said arm assembly for clamping said cable to said arm assembly during high speed towing.

References Cited

UNITED STATES PATENTS

| | | | |
|---|---|---|---|
| 1,589,594 | 6/1926 | Hale | 254—190 |
| 2,862,673 | 12/1958 | Smaltz | 254—175.7 |

FOREIGN PATENTS 1,089,981   3/1955   Germany.

HARVEY C. HORNSBY, Primary Examiner

U.S. Cl. X.R.

242—158; 254—172, 175.7, 186, 190